United States Patent [19]

Kochy et al.

[11] Patent Number: 4,549,471
[45] Date of Patent: Oct. 29, 1985

[54] DEFROSTER SYSTEM FOR USE IN MOTOR VEHICLES

[75] Inventors: Fritz B. Kochy, Mainz; Hermann Bayer, Russelsheim, both of Fed. Rep. of Germany

[73] Assignee: General Motors Corporation, Detroit, Mich.

[21] Appl. No.: 663,352

[22] Filed: Oct. 22, 1984

[30] Foreign Application Priority Data

Nov. 4, 1983 [DE] Fed. Rep. of Germany ....... 3339892

[51] Int. Cl.⁴ ............................................... B60H 1/00
[52] U.S. Cl. .............................. 98/2.09; 237/12.3 R; 165/41; 219/203
[58] Field of Search ..................... 237/12.3 R, 12.3 A; 165/41; 98/2.08, 2.09; 219/203

[56] References Cited

U.S. PATENT DOCUMENTS 3,608,469  9/1971  Mutoh ................................. 98/2.09

Primary Examiner—Henry Bennett
Attorney, Agent, or Firm—Ronald L. Phillips

[57] ABSTRACT

A defroster system for a motor vehicle is disclosed having air discharge openings in the dashboard which enable warm air to flow upwardly and impinge against the windshield. To ensure that the lower portion of the windshield is also being heated, and to prevent the windshield wipers from becoming frozen onto the windshield, secondary air ducts are provided which extend from the defroster duct into an open space which is disposed inside the vehicle in the proximity of the lower edge of the windshield and ahead of the windshield. The secondary air ducts are created by depressions formed into the lower wall of the defroster duct.

1 Claim, 2 Drawing Figures

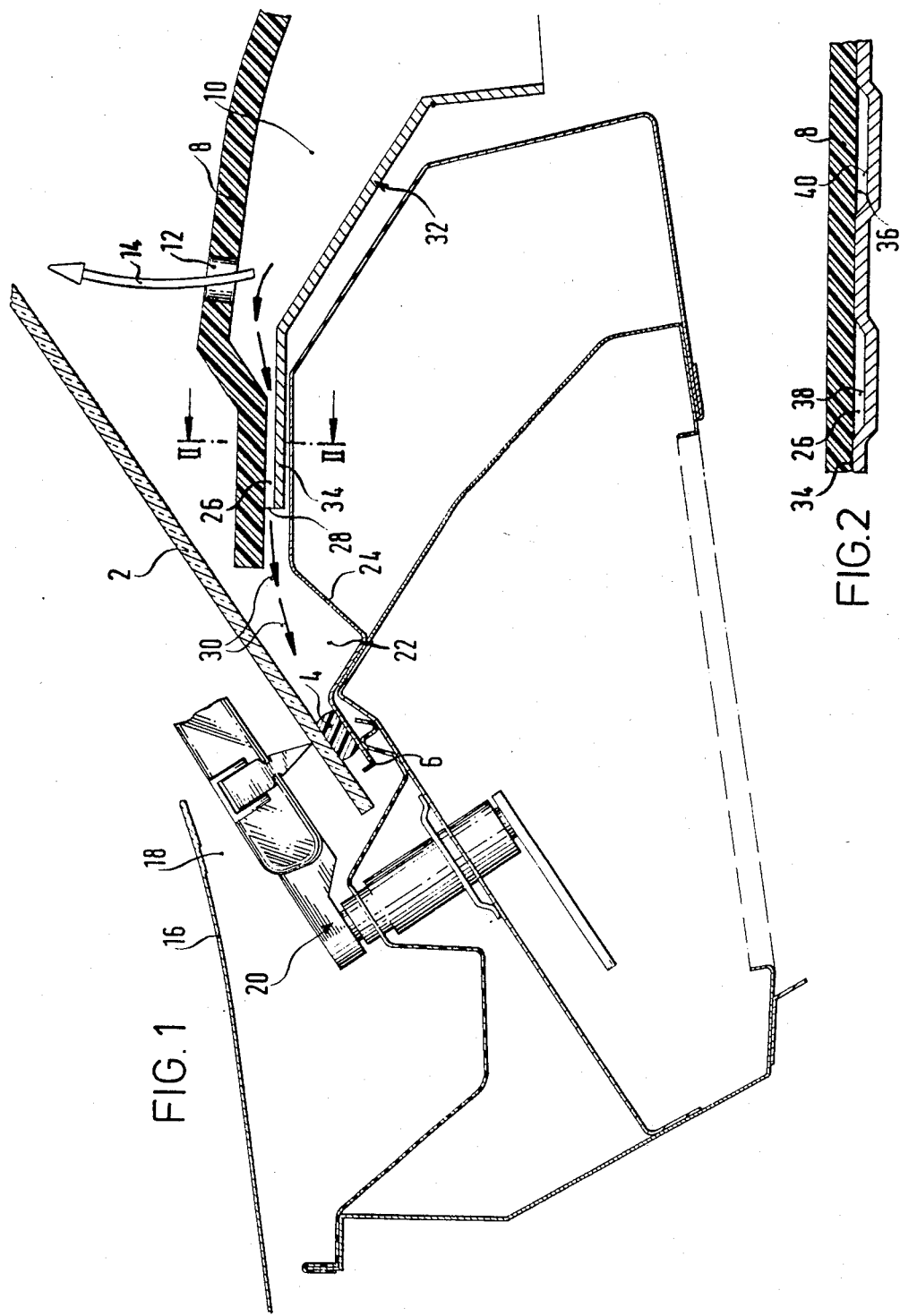

DEFROSTER SYSTEM FOR USE IN MOTOR VEHICLES

TECHNICAL FIELD

The invention relates to a defroster system for use in a motor vehicle having a windshield, wherein hot air discharge openings off a defroster duct are directed towards the inner side of the windshield, and wherein an auxiliary heating means is arranged underneath that portion of the windshield against which hot air is being directed.

BACKGROUND OF THE INVENTION

The purpose of a defroster system in a motor vehicle is to prevent fogging and icing on the windshield at low ambient temperature, an objective which puts high demands on the system when severe frost conditions prevail. The typical defroster system is arranged such that the hot air current impinges against the windshield at the region somewhat below the portion of the windshield through which the vehicle operator is viewing to rapidly clear same of any fog and frost accumulation. Nevertheless, at extremely low ambient temperatures, any snow that is accumulating and freezing at the lower portion of the windshield may not all be melted. This is particularly undesirable for the reason that the windshield wiper blades are located in this area and, as a result, may be subjected to obstruction thereby.

The problem of ice accumulation on the lower portion of the windshield surface area, and obstruction thereby to the windshield wipers is more pronounced when the wipers are arranged so as to park below the rear edge of the engine hood, because with this arrangement the windshield must also be made to extend more downwardly than is otherwise required.

In an effort to overcome the aforementioned problems some remedies have been proposed in the past which, however, have proved to be relatively costly and complex. For instance, in accordance with the teaching contained in the German publication DE-OS-31 32 431, a surface area heat exchanger is arranged on the inner side of the windshield which is connected to the engine cooling system. In the German publication DE-OS-29 02 748 it has been proposed to provide an electrical resistance heater in the lower portion of the windshield where the windshield wipers are parked. Finally, the German publication DE-PS-941 891 describes a motor vehicle in which a hot air stream, which is coming from the engine compartment, is traveling outside the car from the lowermost edge of the windshield upwardly along the windshield.

SUMMARY OF THE INVENTION

It is the primary object of the present invention to provide a defroster system for a motor vehicle which, while only moderately higher in cost than conventional defroster systems, is able to also heat the lower portion of the windshield.

This objective is accomplished by additional heating of the windshield by way of secondary air ducts which extend from the defroster duct to the area near the lower edge of the windshield.

This arrangement provides, on the one hand, that a strong warm air current is able to defog and defrost the windshield viewing area rapidly and effectively and, on the other hand, that a secondary warm air current is directed down to the lower portion of the windshield, so as to heat the windshield in this area and prevent ice formation on the windshield wiper blades.

Apart from the relatively simple means proposed for heating the lower portion of the windshield, the invention provides a defroster system which, unlike units of the hot water heat exchanger type, is not heavier than defroster systems which do not include supplementary means for heating the lower windshield portion, so that the overall weight of the vehicle is not being increased by the employment of the novel defroster system.

One advantageous feature embodied in the invention is that the secondary air ducts are channel-like depressions formed in one surface which is disposed proximate the windshield and which is part of the transversely extending lower wall of the defroster duct, with such lower wall being attached to the dashboard, and the dashboard serving as the upper wall of the defroster duct. By virtue of this arrangement, no extraneous components for providing secondary air ducts are employed. Instead, there are formed depressions in the defroster duct wall during its fabrication, so that the defroster system according to the invention can be manufactured at substantially the same cost as conventional defroster systems.

Another advantageous feature in the present arrangement is that the secondary air ducts are provided on the side directed towards the windshield with air discharge nozzles which extend forwardly in a substantially horizontal direction. As a result, the defroster duct wall need not extend right up to the windshield.

DESCRIPTION OF THE DRAWINGS

The invention is adaptable to numerous design configurations. For a better understanding, one exemplary embodiment is illustrated schematically in the drawings and is described in the following specification.

FIG. 1 is a schematic cross-section view of the pertinent portion of a motor vehicle provided with a defroster system according to the invention.

FIG. 2 is a sectional view taken along line 2—2 of FIG. 1.

FIG. 1 illustrates a windshield 2 of a motor vehicle which is fastened to a flange 6 of the vehicle body by means of an adhesive layer 4. Inside of the vehicle there is arranged rearwardly of the windshield 2 a conventional dashboard 8 which forms the upper wall of a defroster duct 10 and which is provided with upwardly directed hot air outlets 12 through which a warm air current, indicated by arrow 14, is permitted to flow upwardly so as to impinge against the windshield.

As apparent from the drawing, the windshield 2 extends a substantial distance below the dashboard 8. This will create in the lowermost area of the windshield 2 and in front of the same an open space 18 on the outer side of the vehicle which is partially covered by the engine hood 16, and which serves as a recess for accommodating the windshield wiper 20. The downward extension of the windshield also creates an open space 22 inside of the vehicle which is defined by the windshield 2 and a transversely extending wall 24 of the vehicle. One significant feature of the invention is that a hot air current for heating the windshield 2 is permitted to enter into this open space 22 disposed on the inner side of the vehicle. This hot air current is traveling from the defroster duct 10 through the secondary duct 26 to the air discharge nozzle 28, which is aligned in a substantially horizontal direction, so that the hot air current is propelled in the direction of arrows 30 into the open space 22 and against the windshield 2.

The defroster duct is comprised, as is usual, of a lower wall 32, which includes a horizontal surface 34 disposed proximate the windshield 2. As illustrated in FIG. 2, the dashboard 8 is disposed on top of the horizontal surface 34 and attached thereto by means of an adhesive. The secondary air duct 26, as well as other secondary air ducts, of which one secondary air duct 36 is illustrated in FIG. 2, are fashioned by depressions 38, 40 that are formed in the horizontal surface 34 of the lower wall 32 of the defroster duct, so that the manufacturing costs of vehicles incorporating the secondary air ducts 26, 36 will not be affected.

When the defroster system is in the operative mode, a strong hot air current is exiting from the hot air outlets 12 and is impinging against the windshield 2. At the same time, hot air is entering into the open space 22 by way of the secondary air ducts 26, 36, so that the lower portion of the windshield, which is not in the driver's field of view, is also being heated. As a result, snow or water is not permitted to freeze in this area, and on the outer side of the windshield and the windshield wiper blades are effectively prevented thereby from becoming frozen onto the windshield.

The above described preferred embodiment is illustrative of the invention which may be modified within the scope of the appended claims.

The embodiments of the invention in which an exclusive property or privilege is claimed are defined as follows:

1. Motor vehicle having a windshield against which hot air discharge nozzles of a defroster duct, which are disposed inside the vehicle, are directed, and which is provided with auxiliary heating means in an area downwardly of that area against which the hot air current is impinging, the improvement comprising:

the auxiliary heating being effected by secondary air ducts which extend from the defroster duct into the vicinity of the lower edge of the windshield and are defined by channel-like depressions formed in a surface disposed proximate the windshield, said surface being part of a transversely extending lower wall of the defroster duct which is fastened to the dashboard, and wherein the dashboard also serves as an upper wall of the defroster duct.

* * * * *